United States Patent
Okada et al.

(10) Patent No.: US 11,731,647 B2
(45) Date of Patent: Aug. 22, 2023

(54) ROAD SHAPE RECOGNIZER, AUTONOMOUS DRIVE SYSTEM AND METHOD OF RECOGNIZING ROAD SHAPE

(71) Applicant: DENSO CORPORATION, Kariya (JP)

(72) Inventors: Masaya Okada, Nisshin (JP); Takumi Uematsu, Kariya (JP); Tatsuya Namikiri, Kariya (JP); Naru Sugimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 17/352,917

(22) Filed: Jun. 21, 2021

(65) Prior Publication Data
US 2021/0394779 A1   Dec. 23, 2021

(30) Foreign Application Priority Data
Jun. 22, 2020   (JP) .................................. 2020-106685

(51) Int. Cl.
*B60W 60/00*   (2020.01)
*G06T 7/50*   (2017.01)
(Continued)

(52) U.S. Cl.
CPC .............. *B60W 60/00* (2020.02); *G06T 7/20* (2013.01); *G06T 7/50* (2017.01); *G06V 20/58* (2022.01); *G06V 20/584* (2022.01); *G06V 20/588* (2022.01); *B60W 2420/42* (2013.01); *B60W 2552/00* (2020.02); *B60W 2552/53* (2020.02);
(Continued)

(58) Field of Classification Search
CPC ............. B60W 60/00; B60W 2420/42; B60W 2552/00; B60W 2552/53; B60W 2552/30; B60W 2552/20; B60W 40/072; G06T 7/20; G06T 7/50; G06T 2207/30261; G06T 2207/30256; G06T 7/13; G06V 20/58; G06V 20/584; G06V 20/588; G06V 10/44; G01C 21/3819
See application file for complete search history.

(56) References Cited

U.S. PATENT DOCUMENTS

2002/0042668 A1   4/2002 Shirato et al.
2012/0271483 A1* 10/2012 Samukawa ......... B60W 40/072
                                                       701/1
(Continued)

*Primary Examiner* — Kenneth J Malkowski
(74) *Attorney, Agent, or Firm* — Maschoff Brennan

(57) ABSTRACT

A road shape recognizer includes a peripheral information recognizer that recognizes at least two items of peripheral information based on an output of a periphery detector. A reliability assigner assigns a reliability level to each of the peripheral information. A point sequence generator generates and places a point sequence representing a shape of a road on which the own vehicle travels, based on at least two items of peripheral information and the reliability level. The point sequence generator generates and places a point sequence by generating and placing points one by one toward a distant place from a point located at a prescribed relative position to the own vehicle. The point sequence generator generates and places the next point corresponding to an amount of change in shape and a position of a point generated and placed at the end of the point sequence. The amount of change in shape is represented by the peripheral information and determined per section having a prescribed distance.

6 Claims, 9 Drawing Sheets

(51) Int. Cl.
*G06T 7/20* (2017.01)
*G06V 20/58* (2022.01)
*G06V 20/56* (2022.01)

(52) U.S. Cl.
CPC ............... *G06T 2207/30256* (2013.01); *G06T 2207/30261* (2013.01)

(56) References Cited

U.S. PATENT DOCUMENTS

| | | | | |
|---|---|---|---|---|
| 2014/0180497 | A1* | 6/2014 | Kojima | G06V 20/588 |
| | | | | 701/1 |
| 2015/0063648 | A1* | 3/2015 | Minemura | G06F 18/21 |
| | | | | 382/104 |
| 2017/0270373 | A1* | 9/2017 | Kawasaki | B60W 40/072 |
| 2019/0171896 | A1* | 6/2019 | Okada | G06V 10/255 |

* cited by examiner

ROAD SHAPE RECOGNIZER, AUTONOMOUS DRIVE SYSTEM AND METHOD OF RECOGNIZING ROAD SHAPE

CROSS-REFERENCE TO RELATED APPLICATION

This patent application is based on and claims priority to Japanese Patent Application No. 2020-106685, filed on Jun. 22, 2020 in the Japan Patent office, the entire disclosure of which is hereby incorporated by reference herein.

BACKGROUND

Technical Field

This disclosure relates to a road shape recognizer, an autonomous drive system, and a method of recognizing a road shape.

Related Art

To recognize a road shape, a known road shape recognizer calculates a road model that represents the road shape by lines, based on an edge point of a partition line (i.e., road sign) for a vehicle captured by a camera from a road.

However, when the partition line of the vehicle is not recognized due to an obstacle, such as a preceding vehicle, etc., the road model cannot be precisely calculated resulting in erroneous recognition of the road shape. Hence, a technology capable of precisely recognizing the road shape even in such a situation has been desired.

This disclosure is made to raise and address the above-described problem, and it is an object of the present disclosure to provide a novel technology capable of precisely recognizing a road shape even in the above-described situation.

SUMMARY

Accordingly, one aspect of the present disclosure provides a novel road shape recognizer mountable to an own vehicle having a periphery detector to detect surroundings of the own vehicle in given cycles. The road shape recognizer is connected to at least one of a drive controller and an ECU. The road shape recognizer includes a peripheral information recognizer to recognize at least two items of peripheral information and identify a shape of each of the at least two items of peripheral information based on an output of the periphery detector in the given cycles. The peripheral information includes a partition line of a road, a roadside object, and a movement locus of another vehicle. The road shape recognizer further includes a reliability assigner to assign a reliability level to the each of the at least two items of the peripheral information based on an image condition thereof captured by periphery detector. The road shape recognizer further includes a point sequence generator to generate and place a point sequence by generating and placing points in the given cycles in a coordinate system corresponding to a change in shape of one of the at least two items of peripheral information recognized and identified by the peripheral information recognizer and in accordance with the reliability level assigned thereto. The point sequence represents a shape of a road on which the own vehicle travels. The road shape recognizer further includes an output section to output the point sequence to the at least one of a drive controller and an ECU.

The point sequence generator generates and places the point sequence by generating and placing points one by one toward a distant place from a point located at a prescribed relative position to the own vehicle in front thereof. The point sequence generator generates and places the next point corresponding to an amount of subsequent change in shape of one of the at least two items of the peripheral information with reference to a position of a point lastly generated and placed in the previous point sequence. The amount of subsequent change in shape is represented by the one of the at least two items of the peripheral information per prescribed driving distance corresponding to the given cycle.

Another aspect of the present disclosure provides a novel autonomous drive control system comprises a periphery detector to detect surroundings of an own vehicle in given cycles and the above-described road shape recognizer mountable to the own vehicle.

Another aspect of the present disclosure provides a novel method of recognizing a road shape and driving an own vehicle. The method includes the steps of: detecting surroundings of an own vehicle in given cycles; and recognizing at least two items of peripheral information and identifying a shape of each of the at least two items of peripheral information based on the detection result. The peripheral information includes a partition line of a road, a roadside object, and a movement locus of another vehicle. The method further includes the steps of: assigning a reliability level to the each of the at least two items of the peripheral information based on an image condition thereof; and determining an amount of change in shape of the one of the at least two items of the peripheral information with a higher reliability level per prescribed driving distance in a first given cycle. The method further includes the step of generating and placing a point sequence by generating and placing a first point in a coordinate system in a first cycle corresponding to a change in shape of one of the at least two items of peripheral information with a higher reliability level in the first cycle toward a distant place from a point located at a prescribed relative position to the own vehicle in front thereof. The method further includes the step of subsequently generating and placing the point sequence by generating and placing a second point in the coordinate system in a second cycle corresponding to an amount of change in shape of one of the at least two items of the peripheral information with a higher reliability level in the second cycle toward a distant place from the first point. The method further includes the steps of: outputting the point sequence including at least the first and second points to at least one of a drive controller and an ECU; and autonomously driving an own vehicle along the point sequence representing a shape of a road for the own vehicle to travel.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
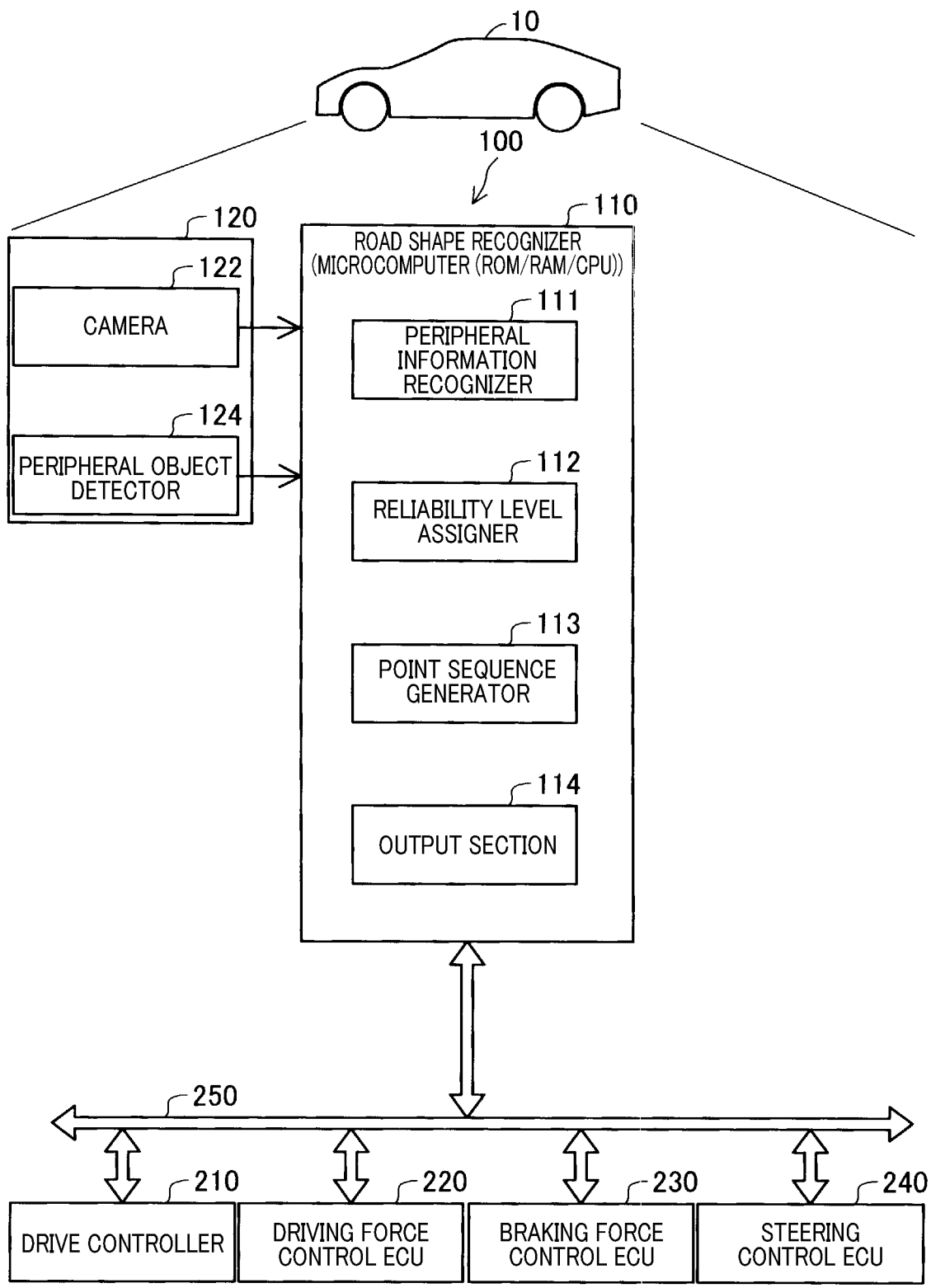
FIG. 1 is a diagram schematically illustrating an exemplary configuration of an autonomous driving system according to one embodiment of the present disclosure.

Referring now to the drawings, wherein like reference numerals designate identical or corresponding parts throughout the several views thereof, and to FIG. 1, a first embodiment is described. As shown, a vehicle 10 includes an autonomous drive control system 100. In this embodiment, the autonomous drive control system 100 autonomously drives the vehicle 10. Hence, according to this embodiment, the autonomous drive control system 100 includes a road shape recognizer 110, a periphery detector 120, and a drive controller 210. The autonomous drive control system 100 also includes a driving force control ECU (Electronic Control Unit) 220, a braking force control ECU 230, and a steering control ECU 240. The road shape recognizer 110, the drive controller 210, and the driving force control ECU 220 are connected via an in-vehicle network 250. The braking force control ECU 230 and the steering control ECU 240 are also connected via the in-vehicle network 250. Hence, these five devices are connected with each other via the in-vehicle network 250. Here, the vehicle 10 may not only be operated autonomously but also manually by a driver.

The periphery detector 120 is able to detect surroundings of the vehicle 10. The periphery detector 120 includes a camera 122 and a peripheral object detector 124. The camera 122 acquires an image by imaging the surroundings of the vehicle 10. The peripheral object detector 124 detects a condition of the surroundings of the vehicle 10. As the peripheral object detector 124, an object detector, such as a laser radar, a millimeter wave radar, an ultrasonic detector (i.e., a sensor), etc., using reflected waves is exemplified.

The road shape recognizer 110 includes a peripheral information recognizer 111, a reliability level assignor 112, and a point sequence generator 113. The road shape recognizer 110 also includes an output section 114. The road shape recognizer 110 includes a microcomputer composed of a central processing unit (CPU), a random-access memory (RAM), and a read only memory (ROM) or the like. Each of these devices is functioned when the microcomputer executes program installed in a memory in advance. However, some or all the functions of these devices may be realized by a hardware circuit.

The peripheral information recognizer 111 is able to recognize at least two items of peripheral information based on an output generated by the periphery detector 120.

Here, the peripheral information includes a partition line drawn on a road, a roadside object, such as a wall, a guardrail, etc., and a movement locus of another vehicle. Hence, based on the output of the periphery detector 120, the peripheral information recognizer 111 recognizes two or more items of information related to the shape of a partition line of the road, a shape of a roadside object, and a shape of a movement locus of a vehicle other than an own vehicle. In this embodiment of the present disclosure, the peripheral information recognizer 111 recognizes a presence and a position of each of left and right partition lines drawn on the left and right sides of on a road where the own vehicle is traveling based on the image captured by the camera 122 and the detection result generated by the peripheral object detector 124. The peripheral information recognizer 111 also recognizes a presence and a position of each of the roadside objects based on the image captured by the camera 122 and the detection result generated by the peripheral object detector 124.

Further recognized by the peripheral information recognizer 111 based on the image captured by the camera 122 and the detection result generated by the peripheral object detector 124 are a presence, a position, and a size of each of one or more vehicles other than the own vehicle. Also further recognized by the peripheral information recognizer 111 based on the image captured by the camera 122 and the detection result generated by the peripheral object detector 124 are a distance, a traveling direction, and a speed of each of one or more vehicles other than the own vehicle. Further recognized by the peripheral information recognizer 111 based on the image captured by the camera 122 and the detection result generated by the peripheral object detector 124 are a yaw angle speed or the like of each of the one or more vehicles other than the own vehicle. The peripheral information recognizer 111 may recognize some of these items of information by inter-vehicle communication with the other vehicle. The peripheral information recognizer 111 recognizes a shape of the partition line and the like based on these pieces of information by using a Karman filter or a least squares method, for example.

That is, various parameters including a horizontal position, an inclination, a yaw angle, a curve, a curvature, a change in curve, an amount of change in curvature, and a clothoid curve, etc., may be obtained as a shape of peripheral information at least from the partition line by applying approximation to a dot image extracted from the partition line when it is recognized by the camera 122, by using either the Kalman filter or the least squares method.

The reliability level assignor 112 assigns a reliability level to each of the peripheral information recognized by the peripheral information recognizer 111. Here, the reliability indicates a degree of certainty of recognition of a shape indicated by peripheral information. That is, the higher the reliability, the more highly likely the shape can be reliable. For example, a reliability level of a shape of a partition line that is clear and easily recognizable as peripheral information is higher than a reliability level of a shape of a partition line which is patchy and difficult to recognize as peripheral information. The reliability level assignor 112 can, for example, designate a reliability level in accordance with a weather and a time when the periphery detector 120 detects surroundings.

The point sequence generator 113 generates and places a point sequence for example, in a coordinate system, representing a shape of a road on which an own vehicle 10 travels, based on at least two items of peripheral information recognized by the peripheral information recognizer 111 and a reliability level assigned by the reliability level assignor 112. More specifically, the point sequence generator 113 generates and places a point sequence by generating and placing points one by one from a point located at a prescribed relative position to a vehicle 10 to a distant place while generating and placing the next point at a forward position of a lastly generated and placed point among points of the point sequence, corresponding to an amount of change in shape. Here, the amount of change in shape is represented by the peripheral information, and is determined per section having a prescribed distance.

The output section 114 outputs the point sequence representing the road shape generated and placed by the point sequence generator 113 to the drive controller 210 or the like through the in-vehicle network 250.

Here, the drive controller 210 includes a microcomputer or the like composed of a central processing unit (CPU), a random-access memory (RAM), and a read only memory (ROM), and realizes an autonomous driving function when the microcomputer executes pre-installed program. The drive controller 210 controls a driving force control ECU 220, a braking force control ECU 230, and a steering control ECU 240 or the like to drive a vehicle along the point sequence representing the road shape generated and placed by the point sequence generating unit 113.

To act as an electronic controller, the driving force control ECU 220 controls an actuator, such as an engine, etc., that causes a driving force for driving a vehicle. Specifically, when a driver drives a vehicle manually, the driving force control ECU 220 controls a power source composed of either the engine or an electric motor in accordance with a depressing amount of depressing an accelerator pedal. By contrast, when the driver drives the vehicle autonomously, the driving force control ECU 220 controls the power source in accordance with a required (or requested) driving force calculated by the drive controller 210.

Further, to act as an electronic controller, the braking force control ECU 230 controls a brake actuator that causes a braking force for braking a vehicle. Specifically, when the driver drives the vehicle manually, the braking force control ECU 230 controls the brake actuator in accordance with an amount of depression of the brake pedal. By contrast, when the driver drives the vehicle autonomously, the braking force control ECU 230 controls the brake actuator in accordance with a required braking force calculated by the drive controller 210.

The steering control ECU 240 controls a steering torque generating motor that generates a steering torque to steer the vehicle. Specifically, when the driver drives the vehicle manually, the steering control ECU 240 controls the steering torque generating motor in accordance with an amount of operation of a steering wheel to generate an assistance torque used in steering operation. As a result, the driver can steer the vehicle using minimal force. By contrast, when the driver drives the vehicle autonomously, the steering control ECU 240 performs steering by controlling the steering torque generating motor in accordance with a required steering angle calculated by the drive controller 210.

Figure 2:
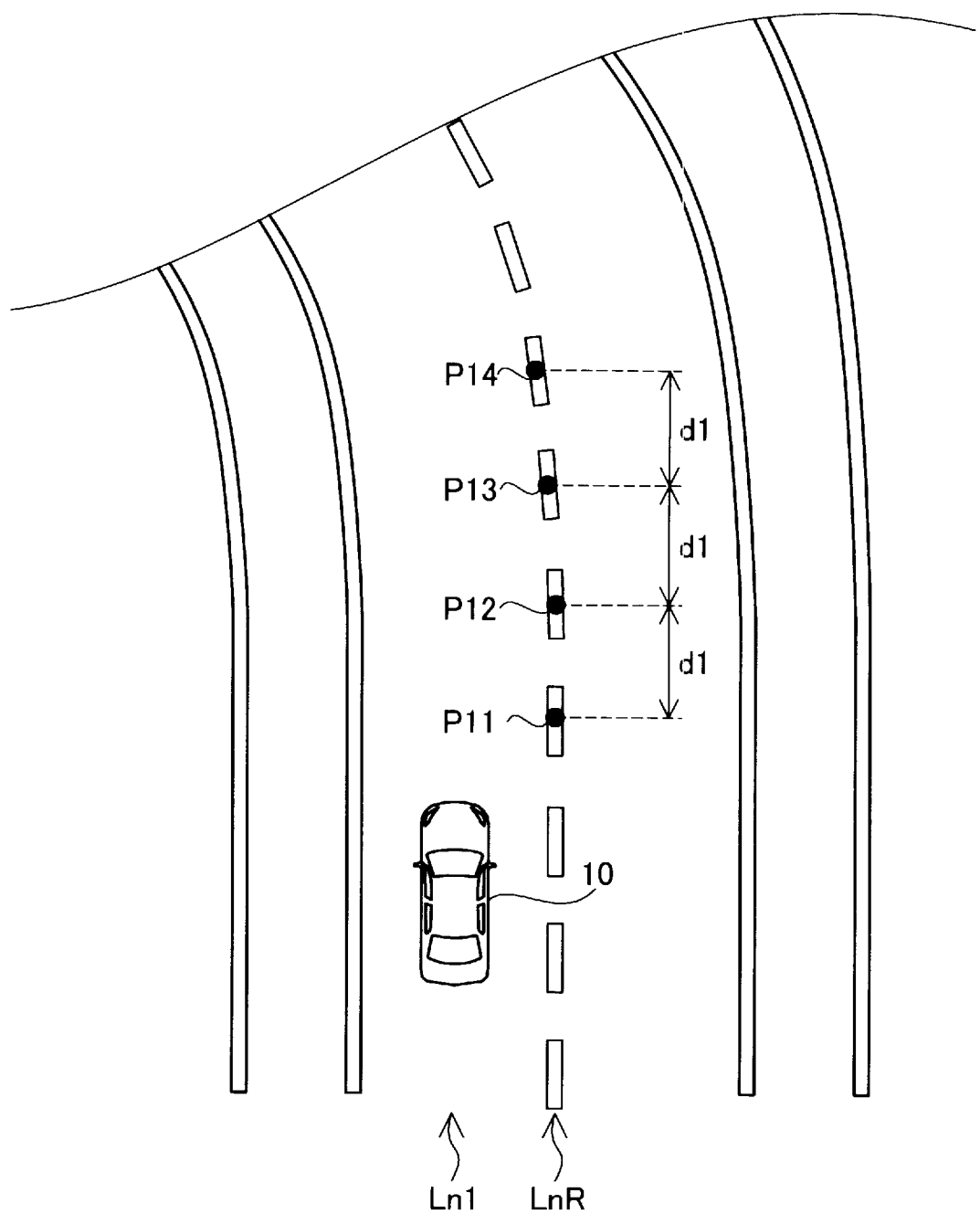
FIG. 2 is a diagram illustrating exemplary peripheral information of a shape of a partition line of a road used according to one embodiment of the present disclosure.
Figure 3:
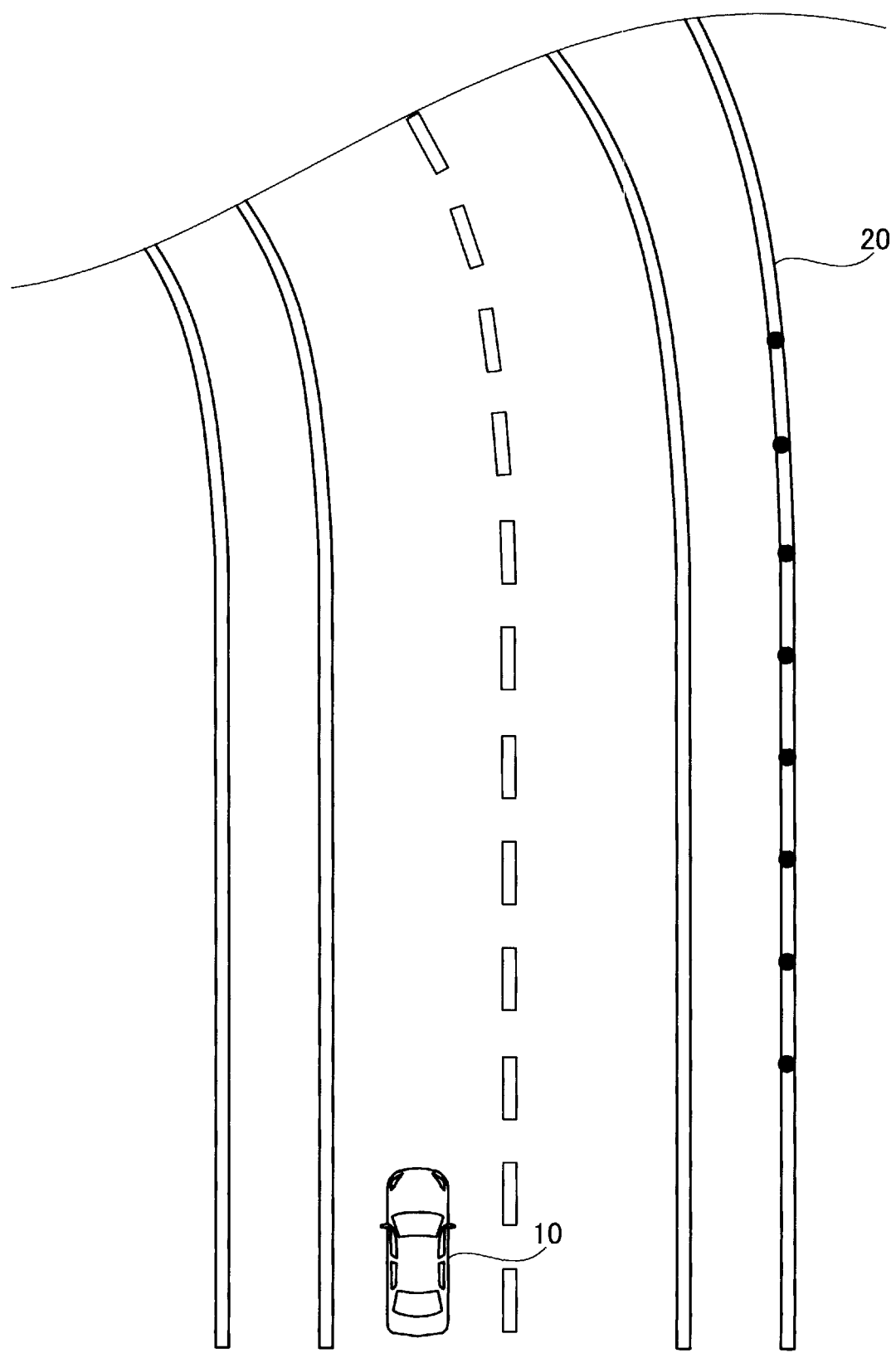
FIG. 3 is a diagram illustrating exemplary peripheral information of a shape of a roadside object used according to one embodiment of the present disclosure.
Figure 4:
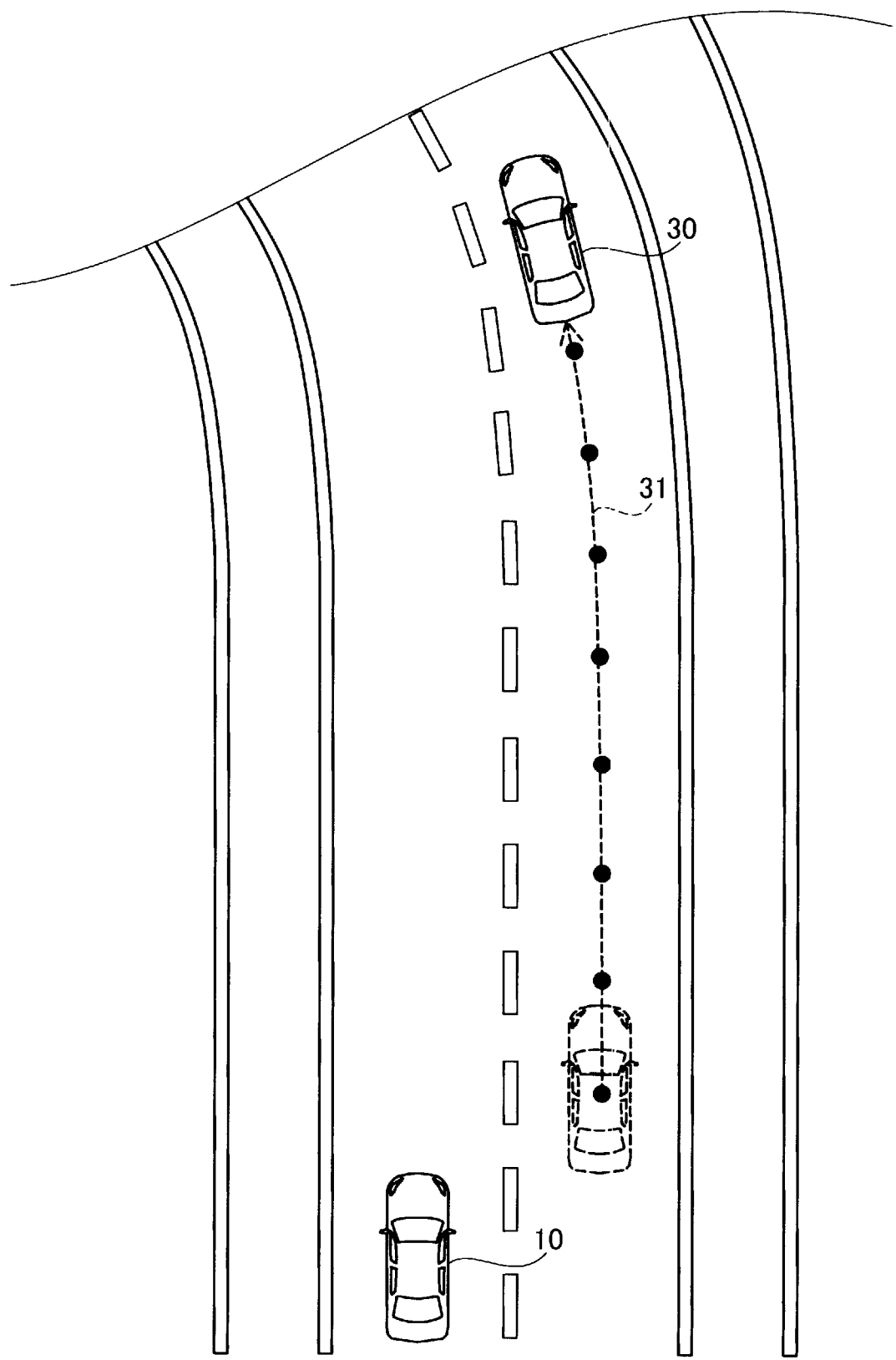
FIG. 4 is a diagram illustrating exemplary peripheral information composed of a movement locus of another vehicle used according to one embodiment of the present disclosure.

Here, peripheral information shown in each of FIGS. 2, 3, and 4 is a point sequence with points being positioned per distance (i.e., interval) d1. For example, as illustrated in FIG. 2, the peripheral information includes a shape of a partition line LnR positioned on the right side of a vehicle lane Ln1 in which the own vehicle 10 is traveling. As shown there, a shape of the partition line LnR is represented by a point sequence formed from points P11 to P14.

Further. the peripheral information shown in FIG. 3 is a shape of the road side object 20 positioned on the right side of the vehicle 10.

Further. the peripheral information shown in FIG. 4 is a transfer locus 31 of the other vehicle 30 traveling on the right side of the vehicle 10.

Figure 5:
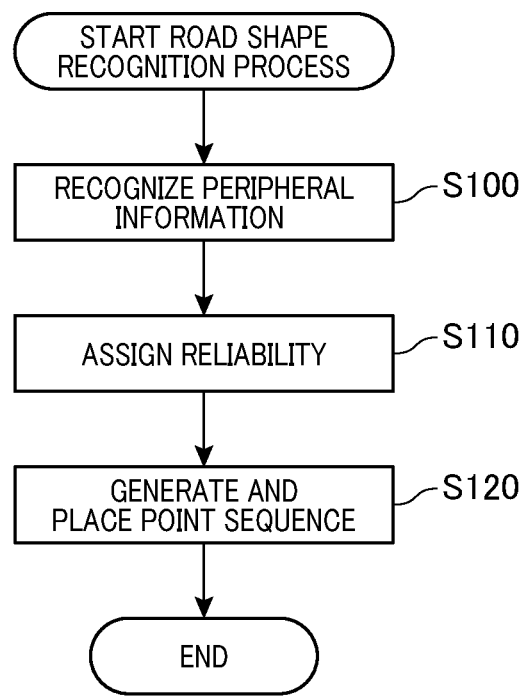
FIG. 5 is a flowchart representing an exemplary road shape recognition process performed according to one embodiment of the present disclosure.

Further, FIG. 5 illustrates a road shape recognition process, in which the point sequence generator 113 recognizes a road shape of a traveling route where the vehicle 10 travels. The process is repeated by the road shape recognizer 110 during running of the vehicle 10, for example, at every 100 ms.

Specifically, in step S100, the peripheral information recognizer 111 recognizes peripheral information. More specifically, the peripheral information recognizer 111 recognizes the peripheral information based on an image around the vehicle 10 captured by the camera 122 and a condition around the vehicle 10 detected by the peripheral object detector 124.

In step S110, the reliability level assignor 112 assigns a reliability level to the peripheral information acquired in step S100 in accordance with a condition thereof. In this embodiment, the reliability level assignor 112 assigns the reliability level per point of the point sequence in the peripheral information. However, the reliability level assignor 112 may designate the reliability level per peripheral information item.

Further, in step S120, the point sequence generator 113 generates and places a point sequence representing a road shape by points based on the peripheral information recognized in step S100, in accordance with the reliability level assigned in step S110.

Figure 6:
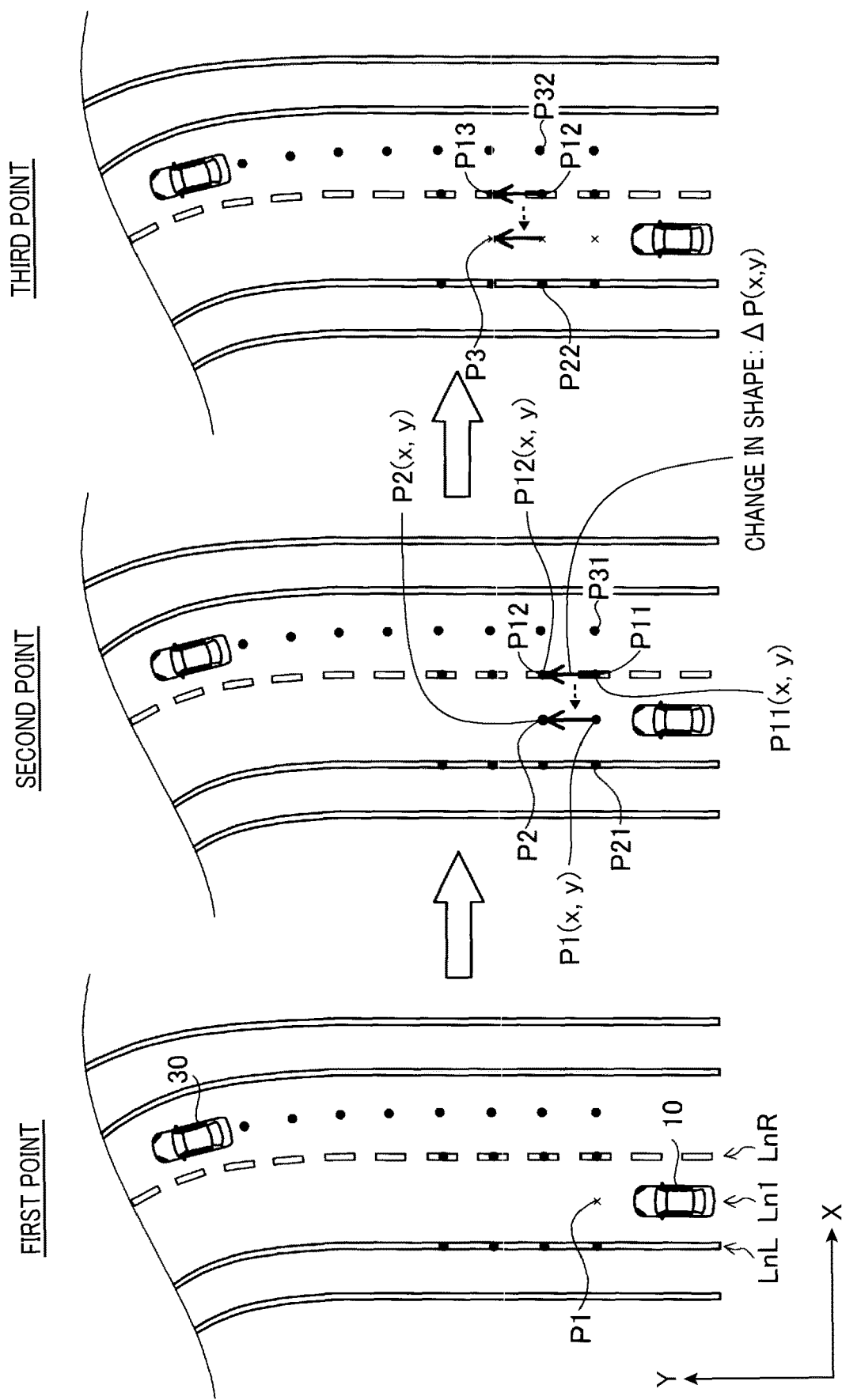
FIG. 6 is a diagram illustrating an exemplary a point sequence generating system of generating and placing a point sequence, for example, in a coordinate system according to one embodiment of the present disclosure.

Here, as illustrated in FIG. 6, the point sequence generated and placed by the point sequence generator 113 in step S120 (see FIG. 5) is represented by ×-symbols. That is, as illustrated there, the point sequence is generated by generating and placing points from a first point P1 to a third point P3 in this order. Herein below, one example of generating and placing a point sequence corresponding to an amount of change in shape of peripheral information with a highest reliability will be described.

Further, the number of items of peripheral information recognized by the peripheral information recognizer 111 is three including a shape of a partition line LnR drawn on the right side of the lane Ln1 in which the vehicle 10 is traveling, a shape of the partition line LnL drawn on the left side of the lane Ln1, and information related to a movement locus of the other vehicle 30. Hence, the amount of change in shape of each of the partition lines and the movement locus is herein below represented by a vector V.

First, the point sequence generator 113 generates and places a first point P1. The first point P1 is generated and placed in front of the vehicle 10 at a position separated by a given distanced from the vehicle 10, for example. Otherwise, the first point P1 can be generated and placed at a central position in the vehicle lane Ln1 estimated based on respective positions of the partition lines LnR and LnL, separated from the vehicle 10 by a prescribed distance.

Next, the point sequence generator 113 generates and places a second point P2 as described below. Here, a reliability level of a point P11 in peripheral information of a partition line LnR is higher than a reliability level of a point P21 in peripheral information of a partition line LnL and that of a point P31 in peripheral information of a movement locus of another vehicle 30. This is because, in general, other vehicles travel by frequently changing a traffic lane, a reliability level of a movement locus thereof is lower than that of the partition line LnR or LnL. Hence, a lower reliability level is assigned by a controller to a movement locus of each of the other vehicles than to each of the partition lines LnR and LnL.

Hence, the point sequence generator 113 generates and places the second point P2 at a position in front of the first point P1 corresponding to an amount of change in shape (i.e., a vector) from the point P11 to a point P12.

For example, a position $P2(x, y)$ in a x-y coordinate system of FIG. 6 is calculated by the following formula;

$$P2(x, y)=P1(x, y)+\Delta P(x, y).$$

Here, $\Delta P(x, y)$ represents an amount of change in shape (i.e., vector) and is calculated by the following formula;

$$\Delta P(x, y)=P12(x, y)-P11(x, y).$$

Hence, when $P1(x, y)$ is (0, 10), $P12(x, y)$ is (1.7, 20), and $P11(x, y)$ is (1.5, 10), $\Delta P(x, y)$ amounts to (0.2, 10).

Next, the point sequence generator 113 generates and places a third point P3. When the partition line LnL is patchy thereby causing recognition thereof to be unstable, and the partition line LnR is clear thereby causing recognition thereof to be stable, a reliability level of the point P12 in the peripheral information of the shape of the partition line LnR is higher than a reliability level of a point P22 in the peripheral information of the shape of the partition line LnL and a reliability level of a point P32 in the peripheral information of the movement locus of the other vehicle 30.

Hence, the point sequence generator 113 generates and places the third point P3 at a position in front of the second point P2 corresponding to an amount of change in shape of the partition line LnR from the point P12 to the point P13.

Here, a point sequence composed of the points P32 and P31 of the movement locus of the other vehicle is generated by extracting current and past positions of the other vehicle from images captured by a camera and/or a radar and the like. However, such an extraction result widely varies, curve fitting and smoothing are applied to the extraction result by using a Kalman filter or least squares method, and is converted into the point sequence with points having a specific longitudinal distance therebetween.

Figure 7:
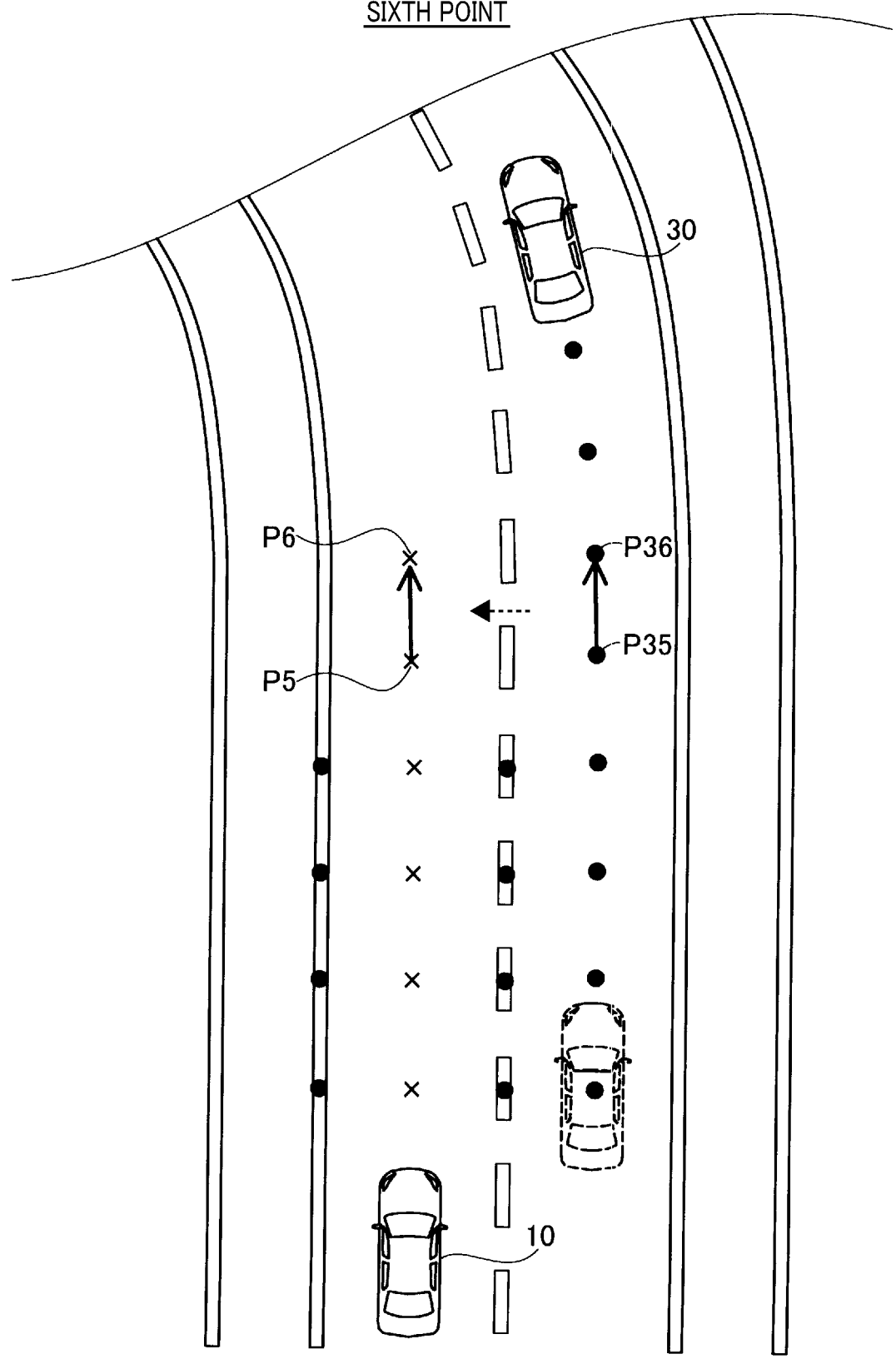
FIG. 7 is a diagram illustrating another exemplary a point sequence generating system of generating and placing a point sequence according to one embodiment of the present disclosure.

Further, as shown in FIG. 7, when information of a shape is absent in each of the partition lines at positions horizontally corresponding to a point P35 in the peripheral information of the movement locus of the other vehicle 30, a reliability level of the point P35 becomes highest. Hence, the point sequence generator 113 generates and places a sixth point P6 at a position in front of the fifth point P5 corresponding to an amount of change in shape of the movement locus of the other vehicle from the point P35 to a point P36.

Figure 8:
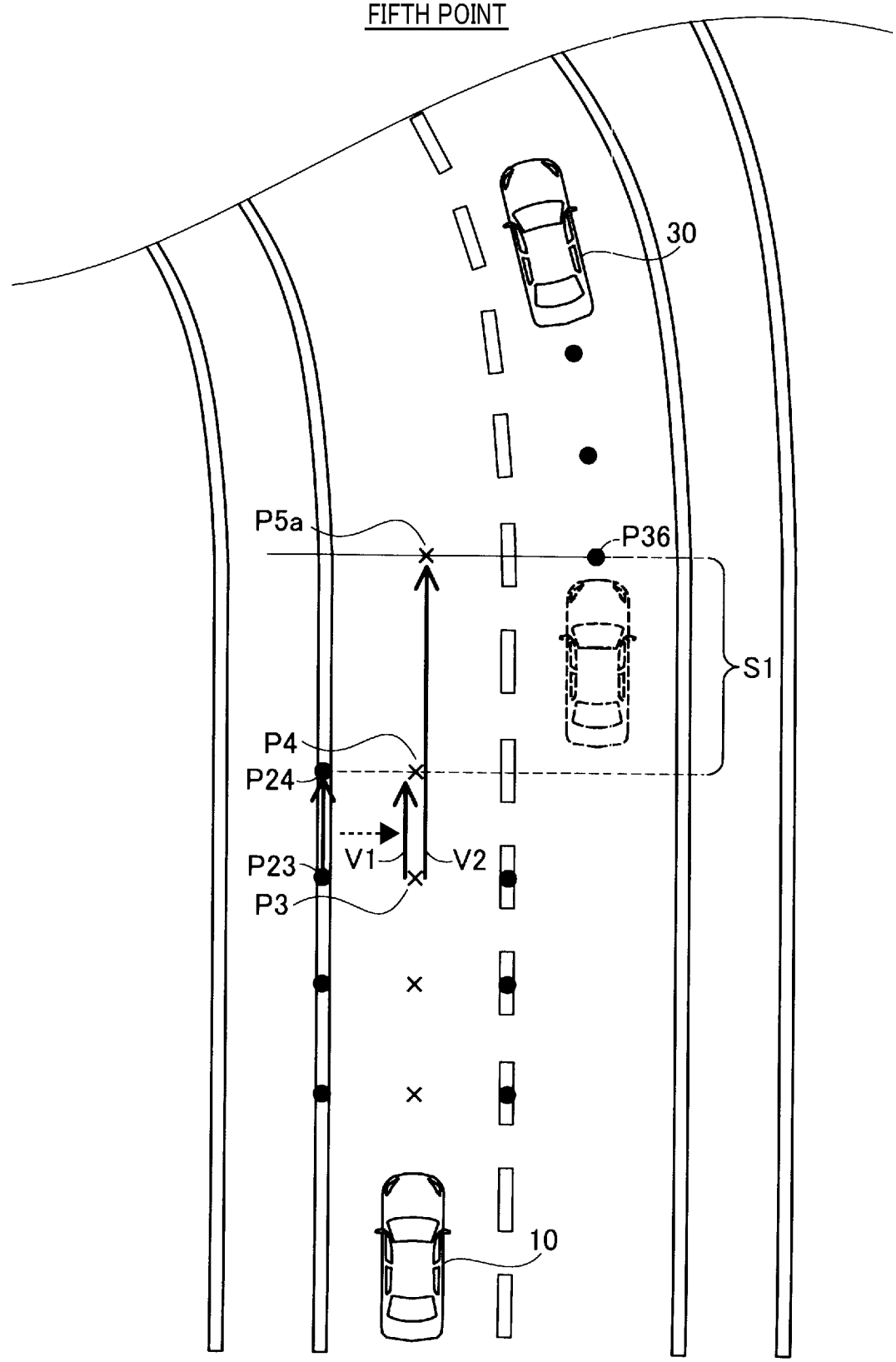
FIG. 8 is a diagram illustrating yet another exemplary a point sequence generating system of generating and placing a point sequence according to one embodiment of the present disclosure.

Further, exemplary designation of a point sequence in case a section S1 in which it is impossible to recognize peripheral information is included as shown in FIG. 8 will be herein below described. Specifically, even when such a section S1 in which the peripheral information cannot be recognized is present, the point sequence generator 113 is able to generate and place a point sequence by generating and placing points corresponding to an amount of change in shape of peripheral information successfully recognized in a prescribed section.

Specifically, as shown in FIG. 8, the point sequence generator 113 generates and places a fourth point P4 at a position in front of the third point P3 corresponding to an amount of change in shape (i.e., V1) of the partition line from a point P23 to a point P24. Further, the point sequence generator 113 is able to generate and place a fifth point P5a at a position in front of the third point P3 corresponding to an amount of change in shape V2 obtained by extending the amount of change in shape V1 up to a horizontal position as a level of the point P36 in the peripheral information of the movement locus of the other vehicle 30.

As described heretofore, according to this embodiment, the point sequence generator 113 of the road shape recognizer 110 generates and places the point sequence by generating and placing points one by one corresponding to the amount of change in shape of at least two items of peripheral information, specifically, two information items which are the shape of the partition lines (LnR and LnL) and the peripheral information of the movement locus of the other vehicle 30, and also using the reliability level of each of the peripheral information items. Hence, even if the partition line on the right side of the vehicle cannot be recognized, for example, a point sequence representing a road shape with points can be recognized based on at least one of the shape of the partition line on the left side of the vehicle, the shape of the road side object, and the movement locus of the other vehicle or the like.

Further, the point sequence generator 113 generates and places the point sequence by generating and placing points one by one from the first point P1 located at a prescribed relative position to the vehicle 10 toward the distant position. Hence, the point sequence can be generated and placed continuously.

Further, beside the peripheral information of the shape of the road partition line, the point sequence generator 113 is able to generate and place a point sequence based on one of the peripheral information of the shape of the roadside object 20 and the peripheral information of the movement locus of the other vehicle 30. Hence, even if the shape of the partition line drawn on the road cannot be accurately recognized from the image captured by the camera 122, since peripheral information of the roadside object 20 and peripheral information related to a movement locus of the other vehicle 30 have information in a height direction, the roadside object 20 and the other vehicle 30 can be recognized. Accordingly, the point sequence generator 113 can generate a point sequence representing a road shape composed of points based on a shape of the roadside object 20 and information related to a movement locus of the other vehicle 30 up to a distant place where a shape of the partition line drawn on the road cannot be accurately recognized.

Further, the point sequence generator 113 generates and places the point sequence by generating and placing points one by one corresponding to the amount of change in shape of the most reliable peripheral information. Hence, it is possible for the road shape recognizer 110 to accurately recognize the road shape.

Further, even when there exists a section S1 in which it is impossible to recognize peripheral information, the point sequence generator 113 generates and places a point sequence corresponding to the amount of change in shape V2 of the peripheral information of the section where it is possible to recognize peripheral information. Hence, even if peripheral information items recognized by the peripheral information recognizer 111 are respectively obtained near the vehicle 10 and far away from the vehicle 10, the point sequence generator 113 is able to generate and place a continuous point sequence. For this purpose, the road shape recognizer 110 is able to recognize the road shape up to the distant place.

Figure 9:
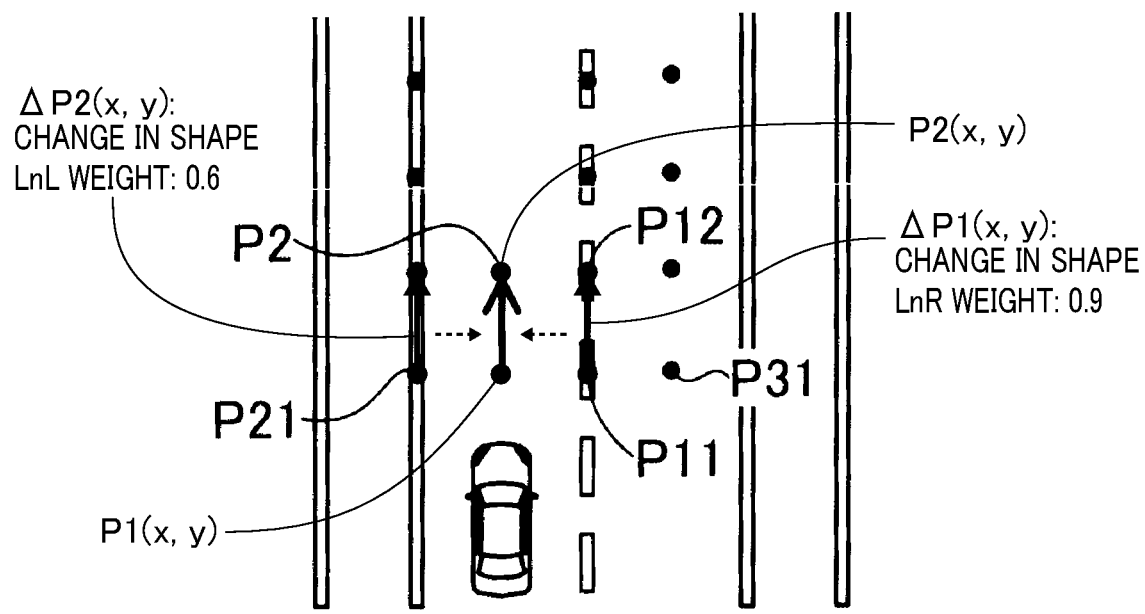
FIG. 9 is a diagram illustrating yet another exemplary a point sequence generating system of generating and placing a point sequence according to one embodiment of the present disclosure.

Next, another embodiment will be described herein below with reference to FIG. 9. In the above-described embodiment, the point sequence generator 113 generates and places the point sequence by generating and placing points one by one corresponding to the amount of change in shape of the most reliable peripheral information. In this embodiment, the point sequence generator 113 is able to generate and place a point sequence by generating and placing points corresponding to an amount of change in shape of at least two items of peripheral information weighted in accordance with a level of reliability.

Specifically, an amount of change in shape (i.e., a vector) in each of two items of peripheral information LnR and LnL is weighted and averaged, and then the next points $P2(x, y)$ is identified by calculating the following formula when $P1(x, y)$ is (0, 10), a change in shape of LnR (i.e., $\Delta P1(x,y)$ ($P12(x,y)-P11(x,y)$)) is (0.2, 10), and a change in parameter of LnL (i.e., $P2(x, y)$ ($P22(x, y)-P21(x, y)$)) is (−0.1, 10), and weights of reliability levels of LnR and LnL are 0.9 and 0.6, respectively:

$$P2(x,y)=P1(x,y)+(0.9\times\Delta P1(x,y)+0.6\times\Delta P2(x,y))/(0.9+0.6).$$

In such a situation, it can be suppressed that an amount of change in shape changes rapidly even when peripheral information for determining an amount of change in shape is switched. Hence, the point sequence generator 113 can reduce or suppress designation of the point sequence at an irregular position.

For example, when a width of a traffic lane increases or decreases at either an entrance or an exit of a curved road, and only one partition line is referred to (i.e., used) to generate and place a point sequence, the point sequence is biased either to the left or the right. Also, when a balance of a patchy level of each of the left and right partition lines changes and a reliability level is reversed, a partition line to be used to generate and place a point sequence is switched from one to another, thereby highly likely to sharply change the point sequence of a road shape.

By contrast, when a change in shape of each of the left and right partition lines is averaged as described above, a point sequence of a road shape can be constantly generated and placed readily almost at a center of the left and right partition lines even if the width of the traffic lane increases or decreases.

Although various embodiments are described heretofore, the present disclosure is not limited thereto, and can include various modifications to the extent that each of these does not deviate from a point of the present disclosure.

For example, technical features included in the above-described embodiment of the present disclosure can be appropriately replaced or combined to address the above-described problem while achieving some or all the above-described advantages. Further, when a technical feature is not described as being essential, it can be deleted as appropriate.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described road shape recognizer and may be altered as appropriate. Further, the present disclosure is not limited to the above-described method of method of recognizing a road shape and may be altered as appropriate.

What is claimed is:

1. A road shape recognizer mountable to an own vehicle having a periphery detector to detect surroundings of the own vehicle in given cycles, the road shape recognizer connected to at least one of a drive controller and an ECU, the road shape recognizer comprising:
   a peripheral information recognizer to recognize at least two items of peripheral information and identify a shape of each of the at least two items of peripheral information based on an output of the periphery detector, the peripheral information including a partition line of a road, a roadside object, and a movement locus of another vehicle;
   a reliability assigner to assign a reliability level to the each of the at least two items of the peripheral information based on an image condition thereof captured by periphery detector;
   a point sequence generator to generate and place a point sequence by generating and placing points in a coordinate system one by one in the given cycles corresponding to a change in shape of one of the at least two items of peripheral information recognized and identified by the peripheral information recognizer,
   the point sequence representing a shape of a road on which the own vehicle is going to travel; and
   an output section to output the point sequence to the at least one of the drive controller and the ECU,
   wherein the point sequence generator generates and places the point sequence by generating and placing points one by one toward a distant place from a point located at a prescribed relative position to the own vehicle in front thereof,
   the point sequence generator generating and placing the next point corresponding to an amount of subsequent change in shape of one of the at least two items of the peripheral information with reference to a position of a point lastly generated and placed in the previous point sequence,
   the amount of subsequent change in shape being represented by the one of the at least two items of the peripheral information per prescribed driving distance corresponding to the given cycle.

2. The road shape recognizer as claimed in claim 1, wherein the point sequence generator generates and places the point sequence by intermittently generating and placing the points corresponding to an amount of change in shape of one of the at least two items of the peripheral information with the highest reliability.

3. The road shape recognizer as claimed in claim 1, wherein the point sequence generator generates and places the point sequence by intermittently generating and placing the points corresponding to an amount of change in shape of each of the at least two items of peripheral information weighted in accordance with the reliability level.

4. The road shape recognizer as claimed in claim 1, wherein the point sequence generator generates and places the point sequence by intermittently generating and placing the points corresponding to an amount of change in shape of the other one of the at least two items of peripheral information when a shape of the one of the at least two items of peripheral information is impossible to be recognized and the other one of the at least two items of peripheral information is impossible to be recognized.

5. An autonomous drive control system comprising:
a periphery detector to detect surroundings of an own vehicle in given cycles; and
a road shape recognizer mountable to the own vehicle, the road shape recognizer connected to at least one of a drive controller and an ECU, the road shape recognizer including:
    a peripheral information recognizer to recognize at least two items of peripheral information and identify a shape of each of the at least two items of peripheral information based on an output of the periphery detector in the given cycles, the peripheral information including a partition line of a road, a roadside object, and a movement locus of another vehicle;
    a reliability assigner to assign a reliability level to the each of the at least two items of the peripheral information based on an image condition thereof captured by periphery detector;
    a point sequence generator to generate and place a point sequence by generating and placing points in the given cycles in a coordinate system corresponding to a change in shape of one of the at least two items of peripheral information recognized and identified by the peripheral information recognizer and the reliability level assigned thereto,
    the point sequence representing a shape of a road on which the own vehicle travels; and
    an output section to output the point sequence to the at least one of the drive controller and the ECU,
wherein the point sequence generator generates and places the point sequence by generating and placing points one by one toward a distant place from a point located at a prescribed relative position to the own vehicle in front thereof,
the point sequence generator generating and placing the next point corresponding to an amount of subsequent change in shape of one of the at least two items of the peripheral information with reference to a position of a point lastly generated and placed in the previous point sequence, the amount of subsequent change in shape being represented by the one of the at least two items of the peripheral information per prescribed driving distance corresponding to the given cycle.

6. A method of recognizing a road shape and driving an own vehicle, the method comprising the steps of:
detecting surroundings of an own vehicle in given cycles;
recognizing at least two items of peripheral information and identifying a shape of each of the at least two items of peripheral information based on the detection result, the peripheral information including a partition line of a road, a roadside object, and a movement locus of another vehicle;
assigning a reliability level to the each of the at least two items of the peripheral information based on an image condition thereof;
determining an amount of change in shape of the one of the at least two items of the peripheral information with a higher reliability level per prescribed driving distance in a first given cycle;
generating and placing a point sequence by generating and placing a first point in a coordinate system in a first cycle corresponding to a change in shape of one of the at least two items of peripheral information with a higher reliability level in the first cycle toward a distant place from a point located at a prescribed relative position to the own vehicle in front thereof;
subsequently generating and placing the point sequence by generating and placing a second point in the coordinate system in a second cycle corresponding to an amount of change in shape of one of the at least two items of the peripheral information with a higher reliability level in the second cycle toward a distant place from the first point;
outputting the point sequence including at least the first and second points to at least one of a drive controller and an ECU; and
autonomously driving an own vehicle along the point sequence representing a shape of a road for the own vehicle to travel.

\* \* \* \* \*